United States Patent [19]

Mojonnier

[11] Patent Number: 4,737,037
[45] Date of Patent: Apr. 12, 1988

[54] BEVERAGE PROPORTIONER APPARATUS

[76] Inventor: Harry G. Mojonnier, 1238 Franklin Ave., River Forest, Ill. 60305

[21] Appl. No.: 899,972

[22] Filed: Aug. 25, 1986

[51] Int. Cl.$^4$ ............................................. B01F 15/04
[52] U.S. Cl. ...................... 366/152; 99/275; 137/606; 141/105; 141/198; 141/236; 141/367; 222/133; 366/155; 366/162
[58] Field of Search ............... 366/131, 150, 151, 152, 366/153, 154, 155, 160, 162; 137/606; 222/133; 55/164, 165, 167; 99/275, 323.3; 141/367, 236, 105, 198

[56] References Cited

U.S. PATENT DOCUMENTS

| | | | |
|---|---|---|---|
| 1,776,019 | 4/1930 | Elliott | 55/165 |
| 2,927,594 | 7/1960 | Hayden et al. | 137/115 |
| 3,109,631 | 11/1963 | Purjahn | 366/152 |
| 3,237,808 | 6/1966 | Witt et al. | 222/64 |
| 3,272,020 | 1/1964 | Witt et al. | 74/18.1 |
| 3,286,764 | 3/1966 | Mojonnier et al. | 159/44 |
| 3,446,241 | 4/1969 | Skoli | 137/553 |
| 3,741,552 | 10/1973 | Skoli et al. | 261/140 |
| 3,945,411 | 10/1976 | Skoki et al. | 141/91 |
| 4,112,828 | 8/1978 | Mojonnier et al. | 99/275 |
| 4,191,784 | 2/1980 | Mojonnier et al. | 426/475 |
| 4,216,711 | 7/1980 | Skoli et al. | 99/277.2 |
| 4,259,022 | 3/1981 | Folland | 366/153 |
| 4,265,167 | 5/1981 | Mojonnier et al. | 99/323.2 |
| 4,300,923 | 9/1981 | Skoli et al. | 55/196 |
| 4,350,503 | 6/1982 | Skoli et al. | 55/165 |
| 4,352,679 | 6/1982 | Notardonato et al. | 55/38 |
| 4,352,682 | 12/1982 | Kemp et al. | 55/165 |
| 4,358,296 | 8/1982 | Notardonato et al. | 55/38 |
| 4,509,863 | 4/1985 | Borrow | 366/152 |

Primary Examiner—Robert W. Jenkins
Attorney, Agent, or Firm—Trexler, Bushnell, Giangiorgi & Blackstone, Ltd.

[57] ABSTRACT

A proportioner apparatus for mixing together at least two fluids in controlled, preselected proportions, comprises first and second fluid inlet reservoirs, first and second fluid inlets coupled respectively for delivering fluids to the first and second reservoirs, first and second outlets coupled respectively with the reservoirs for receiving a flow of fluid therefrom, each said inlet having a control valve for controlling the flow of fluid therethrough in response to predetermined control signals, and each said reservoir having level sensor therein for producing the control signals in accordance with the level of fluid therein. A novel orifice-defining assembly is associated with at least one of the outlets for, together with the level of fluid in the associated reservoir, controlling the rate of flow of fluid through the outlet whereby any desired one of a plurality of different flow rates may be achieved by selection and placement in the outlet of a removable mounting assembly having a plate with an orifice of a size selected to achieve the desired flow rate. Preferably a stratification prevention arrangement is also employed to prevent stratification of fluids in the proportioner.

17 Claims, 2 Drawing Sheets

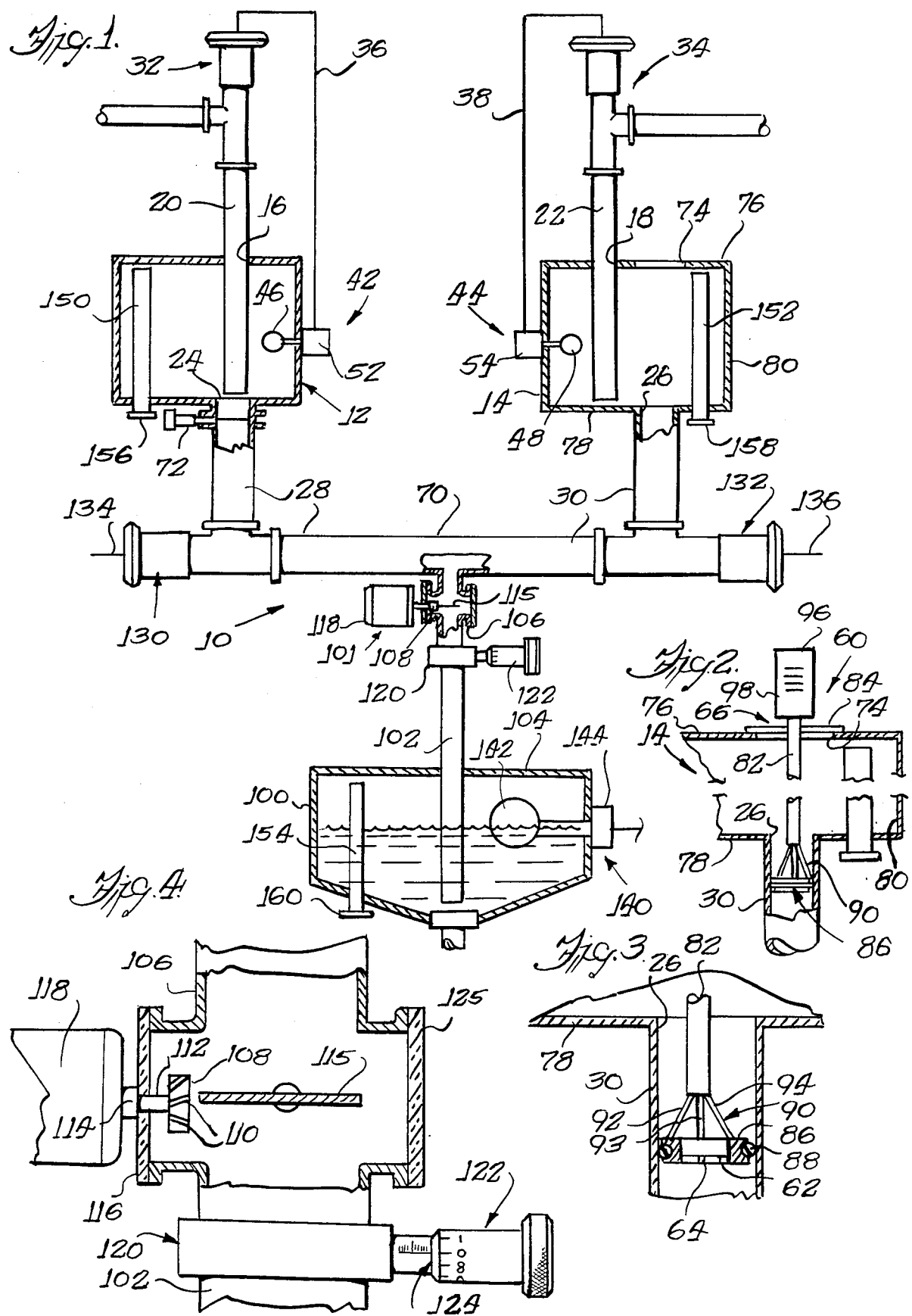

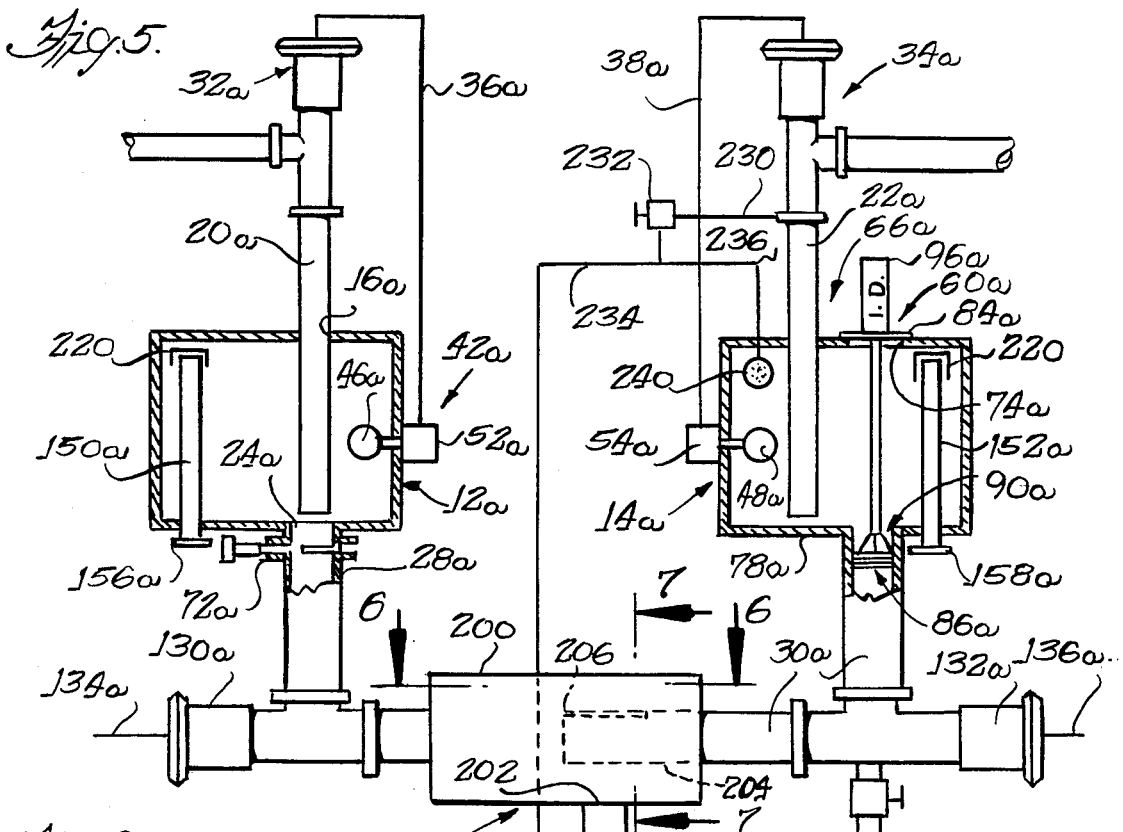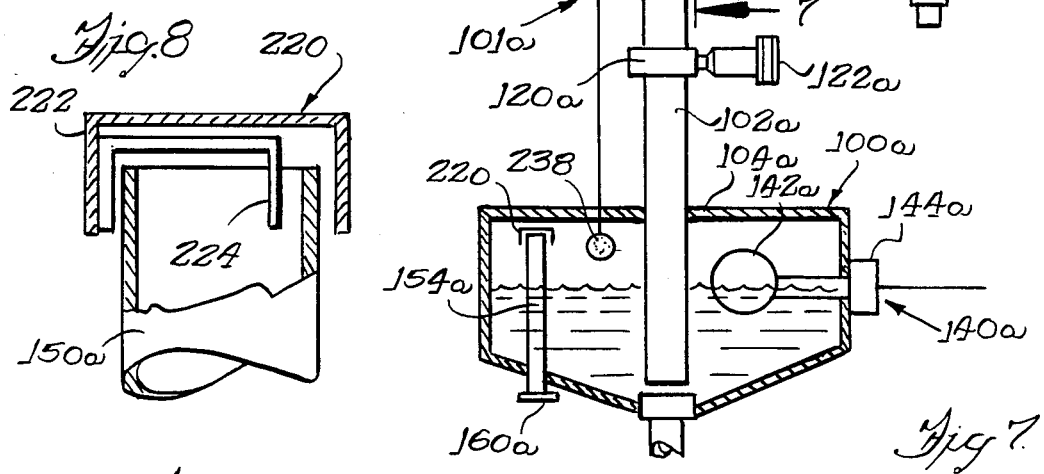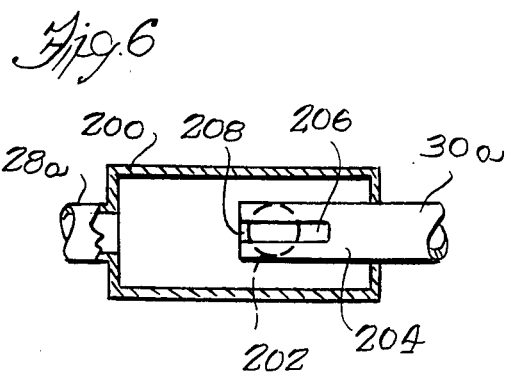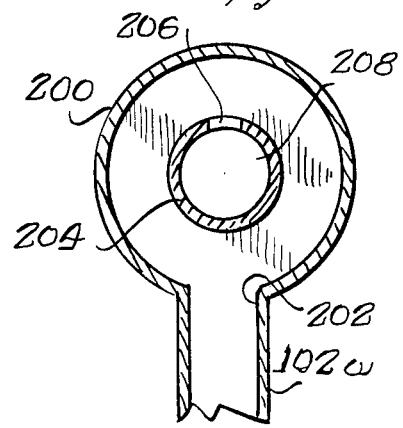

BEVERAGE PROPORTIONER APPARATUS

BACKGROUND OF THE INVENTION

This invention is directed generally to the beverage processing arts, and more particularly to a novel and improved beverage proportioner apparatus for mixing the fluid components of a beverage in the desired proportions.

More specifically yet, the present invention is concerned with a novel and improved proportioner apparatus which utilizes a number of novel features to achieve not only accurate proportioning or mixing of fluids but also a matching of the fluid flows therethrough with both upstream and downstream processing and/or filling equipment. The present invention concerns a fluid flow arrangement in such a proportioning apparatus for achieving such control and flow matching. Moreover, the invention provides novel apparatus for rapidly changing over the proportioning apparatus to mix fluids in different proportions for the preparation of different types of beverages.

The proportioner of the invention may advantageously be utilized in connection with a system of the type shown in my co-pending application, Ser. No. 654,304 filed Sept. 24, 1984, entitled Scrubbing Apparatus. In my aforesaid co-pending application, there is disclosed a novel arrangement which I have termed "head-over-orifice" for controlling fluid flow through a scrubbing or deaerating type of apparatus which may be used in beverage processing systems, among other applications. The present invention also makes use of my head-over-orifice principles for controlling the rate of flow of fluids therethrough and assuring the mixing of fluids in the proper desired proportions, as well as for matching the flow through the proportioner with both upstream supply and downstream demand.

As an additional matter, beverage processing operations require periodic cleaning of the processing equipment, preferably by passing a charge of boiling water, or other suitable cleaning fluids or solutions through the system. It is desirable during such cleaning to assure that the boiling water or other cleaning fluid passes through the system at a maximum rate so as to contact and clean substantially all interior surfaces of the equipment. Accordingly, various restricted openings and the like which may be provided in the proportioner in order to secure the desired proportions of fluid flow through various parts thereof may interfere with the desired flow of boiling water or other cleaning fluids. Hence, it is desirable to provide for full opening or removal of such restrictions in the system, if possible, to facilitate cleaning.

As a further matter, it is often desirable to provide some means for assuring thorough mixing of the ingredients or fluids in the proportioner system or apparatus. While thorough mixing is usually obtained due to the flow rates maintained during operation, such is not always the case during shutdown and subsequent start-up of the equipment. Such shutdown and start-up or cycling may occur at the beginning and end of production runs, or at some intermediate points due to malfunction or shutdown of other upstream or downstream equipment. At the time of such an interruption of the operating cycle, ingredients may be still in transit at certain points in the proportioner apparatus, such that relatively heavier ingredients or components may tend to separate out. My present invention, as will be seen presently, provides means for substantially avoiding such separating out of heavier components during interruptions in the operating cycle.

OBJECTS OF THE INVENTION

Accordingly, it is a general object of the invention to provide a novel and improved beverage proportioner apparatus.

A more specific object is to provide a proportioner apparatus which is adapted to address the concerns mentioned hereinabove.

A related object is to provide a proportioner apparatus in accordance with the foregoing objects which is relatively simple and inexpensive in its design and manufacture and yet highly reliable in operation.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

FIG. 1 is a side elevation, partially in section and partially broken away, illustrating a proportioner in accordance with the invention, somewhat in diagrammatic form;

FIG. 2 is an enlarged partial elevation, partially broken away and partially in section, illustrating further details of a lift-out orifice portion of the proportioner apparatus of the invention;

FIG. 3 is a further enlarged partial sectional view showing further details of the lift-out orifice portion of FIG. 2;

FIG. 4 is an enlarged elevational view, partly broken away and partly in section illustrating further details of an agitator and baffle arrangement and adjacent micrometer-like flow adjustment member of the proportioner apparatus of FIG. 1;

FIG. 5 is a side elevation similar to FIG. 1 illustrating a proportioner in accordance with a second embodiment of the invention;

FIG. 6 is a partial sectional view taken generally in the plane of the line 6—6 of FIG. 5;

FIG. 7 is an enlarged partial sectional view taken generally in the plane of the line 7—7 of FIG. 5; and FIG. 8 is an enlarged partial elevation, partially in section and partially broken away, illustrating details of a preferred vent cap arrangement utilized in the proportioner of FIG. 5.

DETAILED DESCRIPTION OF THE ILLUSTRATED EMBODIMENT

Referring now to the drawings and initially to FIG. 1, a proportioner apparatus in accordance with the invention is designated generally by the reference numeral 10. The proportioner apparatus or unit 10 herein illustrated is configured for mixing together two different fluids in controlled, preselected proportions to produce a beverage, for example. Such fluids may be a premixed syrup or concentrate material and water, for example; however, it should be recognized that the invention is not limited thereto, or indeed to the mixing of two ingredients, as such. On the contrary, the proportioner of FIG. 1 may readily be modified to mix three or even more ingredients without departing from the principles of the invention.

In the illustrated embodiment, the proportioner unit 10 has first and second fluid inlet or upper reservoir members 12 and 14, each of which has an upper inlet opening 16, 18 through which extends a fluid inlet conduit 20, 22. Each of the reservoirs further includes a lower fluid outlet orifice or opening 24, 26, to which is coupled a respective fluid outlet conduit 28, 30.

Each of the inlet conduits is provided with a control valve designated generally by reference numerals 32, 34 for controlling the flow of fluid therethrough to its respective reservoir 12, 14, in response to predetermined control signals received over an associated control line 36, 38. These control signals are developed by a level sensing means or assembly designated generally by reference numerals 42, 44, in accordance with the level of fluid detected thereby in the respective reservoirs 12, 14.

Preferably, the controlled valve arrangement including the valves 32, 34 and associated level-sensing control signal producing units 42, 44 are in the form of pneumatic or air-controlled devices. That is, each of the level sensing and control units 42, 44 includes a float member 46, 48 within the associated reservoir, and this float is operatively coupled with an air pilot control valve unit 52, 54. The latter pilot valve produces a pilot signal for controlling pneumatic air flow to the associated valve 32, 34 which is also of the pneumatic or air-controlled type. In this regard, these valves and associated control units may be of the type shown and described in U.S. Pat. No. 3,272,020.

In accordance with a feature of the invention, at least one of the outlet conduits 28, 30 is provided with novel removable orifice-defining means designated generally by reference numeral 60 and illustrated in FIGS. 2 and 3. This orifice defining means or assembly 60 comprises a plate-like orifice-defining member 62 which has a through orifice 64 therein of selectable size. An additional mounting means or assembly 66 is provided for holding this plate in the desired position relative to outlet means or conduit 30 and also for removably introducing this plate into the outlet conduit for restricting the fluid flow therethrough to the through orifice 64. Accordingly, any one of a plurality of desired flow rates through outlet conduit 30 may be achieved by the selection of a given assembly 60 having a plate 62 mounted thereto with an orifice 64 of a size selected to achieve the desired flow rate.

In operation, it should be recognized that the size of the orifice 64, together with the hydrostatic head or level of fluid within reservoir 14 will determine the rate of flow of fluid through the outlet conduit 30. This arrangement is then utilized to in effect control the proportion of fluid flowing through outlet conduit 30 relative to the proportion of fluid from reservoir 12 flowing through its associated outlet conduit 28. These two conduits are joined at a point downstream of the selectable orifice assembly 60 at a common pipe or conduit 70 to permit intermixing of the two fluids in the desired relative proportions To this end, an additional manually adjustable flow control member or valve 72 may be provided in outlet conduit 28 for, together with the hydrostatic head or level of fluid in reservoir 12, controlling the rate of flow of fluid through the outlet conduit 28.

In the illustrated embodiment, the removable orifice-defining means will be seen to be configured for introduction and removal, generally through a further opening 74, provided in a top wall 76 of reservoir 14. This opening 74 is generally in alignment with the outlet orifice 26, which is located in a bottom wall 78, which is generally spaced from and parallel to top wall 76. In this regard, side wall means 80 joins the respective top and bottom walls 76, 78. The side wall means 80 may be of any desired shape or configuration without departing from the invention.

More particularly, and referring now to FIGS. 2 and 3, the mounting means or portion 66 of the orifice-defining assembly 60 includes an elongatge, rod-like member 82 which has a transverse support member 84 at an upper end thereof. This transverse support member 84 is of sufficient extent to overlie the through opening 74 so as to suspend the elongate rod-like member 82 therebelow. The rod-like member 82 is of sufficient length to extend at least into the outlet opening 26. At an opposite or lower end of rod-like member 82 is a plate-carrier member or assembly 86 for holding the plate 64 and suspending the same within the outlet conduit 30.

Preferably, the outlet conduit 30 is a cylindrical tubular conduit and the plate-carrier member 86 comprises a generally annular support member having an annular sealing ring or O-ring 88 of elastomeric material thereabout for sealing engagement with an internal surface of the tubular outlet conduit 30. The mounting means 66 further includes a hanger member 90 which extends divergently from the lower end of the elongate rod-like member 82 receive and support the annular plate-carrier 86 suspended therefrom. This divergent hanger member 90 is preferably a cage-like member formed from one or more relatively thin rods 92, 93, 94 which diverge from the lower end of the elongate rod 82 in a generally conical configuration This arrangement is such as to hold the plate-carrier member substantially centered relative to both the elongate rod-like member 82 and the generally cylindrical outlet conduit 30. A further upwardly extending gripping member 96 may also be provided for the mounting means or assembly 66 and this latter member may include suitable indicia 98 thereon relating to the size of the orifice 64 associated therewith.

In accordance with a further feature of the invention, an additional stratification preventing means or assembly 101 is provided where the two outlet conduits 28, 30 come together for facilitating the intermixing of fluids. In the illustrated embodiment, a third or outlet reservoir 100 is provided generally below or beneath the first and second inlet reservoirs 12 and 14 for receiving the intermixed fluids therefrom and delivering the mixed fluids in a controlled fashion to further downstream equipment. This outlet reservoir 100 receives the mixed fluids from an inlet conduit 102 which extends through a top wall 104 thereof. As previously mentioned, the respective outlet conduits 28 and 30 are coupled together at a conduit 70 at a point downstream of the adjustable-orifice defining means or assembly 60. This latter conduit 70 feeds the fluids therein directly to vertical inlet conduit 102.

Accordingly, in the embodiment illustrated in FIGS. 1-4, the stratification preventing means or assembly 101 comprises agitator means disposed at an upper portion of this inlet conduit 102 to facilitate the intermixing of fluids therein as they enter from the coupling or intermediate conduit 70. As best viewed in FIG. 4, the agitator means is mounted to a generally T-shaped conduit section 106 and includes an agitator member 108 which may be a generally circular body having a plurality of fins or projections 110. This agitator member 108 is preferably coupled to a shaft 112 which extends by way of a sealed bearing arrangement 114 through a sidewall 116 of the T-shaped section 106, to a rotatable drive means such as an electric motor 118. Hence, the agitator member 108 may be rotated at a desired speed within the T-section 106 to accomplish agitation and mixing of the fluids as they pass therethrough.

In accordance with the preferred form of the invention illustrated, further baffle means which may comprise a generally flat baffle plate 115 is also mounted in the inlet conduit 102 and more specifically in the T-section 106 generally adjacent the agitator 108 for further facilitating the intermixing of fluids therein. Preferably the inlet conduit 102 is provided with a further flow control or flow-restricting means or arrangement 120 for controlling, together with the head of fluid thereabove, the rate of flow of fluid therethrough In the illustrated embodiment, this adjustable flow-restricting means includes an operator accessible micrometer-like adjusting member 122 having a vernier-like indicia or dial thereon as generally indicated by reference numeral 124. The T-section 106 may be additionally provided with a transparent cover or sight glass 125 at a side thereof opposite the wall 116 for observing the flow of fluid and agitation or mixing thereof therewithin Referring again to FIG. 1, in the preferred form of the invention illustrated, an additional adjustable valve or flow-control member or assembly 130, 132 is provided in each of the outlet conduits 28, 30. These valve or flow control members 130 and 132 are of substantially the same type as valves 32 and 34 described hereinabove. That is, these valves 130, 132 are responsive to predetermined control signals received on control lines 134, 136 for controlling, together with the static head of fluid thereabove, the rate of flow through the respective conduits 28 and 30. Preferably, an additional level sensing means or assembly 140 is provided associated with outlet reservoir 100 for producing the necessary control signals for controlling these two valves 130 and 132 in accordance with the level of fluid in the reservoir 100. This level sensing arrangement preferably includes a float member 142 and air pilot control valve member 144 for pneumatic control of the valves 130 and 132 in the same fashion as described above with respect to valves 32 and 34.

It will be appreciated that these flow-control valves 32, 34 and 130, 132 provide control of fluid throughout the proportioner unit or assembly 10 so as to generally coordinate the flow therethrough with both the upstream supply of fluid and the downstream demand. That is as the upstream supply of fluid increases (or downstream demand decreases), level sensing means 52 and 54 will correspondingly decrease the flow through valves 32 and 34 to maintain a desired head or level of fluid in respective reservoirs 12 and 14. Conversely, as upstream flow decreases (or downstream demand increases) the opposite will occur with valves 32 and 34 being opened to the extent necessary to maintain the desired level. In the same fashion, the desired level of fluid will generally be maintained in outlet reservoir 100 by the operation of the float-controlled valves 130 and 132 in connection with the associated level-responsive control assembly 140. Hence, as downstream demand increases or decreases, the level-responsive control 140 can correspondingly increase or decrease the flow into reservoir 100 at valves 130 and 132.

Moreover, additional upstream and/or downstream control members or sensors may be provided, if desired, for interrupting the operation of the proportioner at one or more of the valves 32, 34 and 130, 132. Such sensors may detect irregularities or other interruptions or the like in the flow characteristics in upstream or downstream equipment and produce corresponding control signals for alternatively closing off the respective valves or returning the valves to normal operation in connection with their associated level-responsive controls as decribed above.

In accordance with the preferred form of the invention illustrated herein, each of the reservoirs 12, 14 and 100 is further provided with a venting tube or arrangement 150, 152 and 154 to vent the interior thereof to atmosphere. These vents generally comprise elongate tubes which extend through bottom walls of the respective reservoirs to a point adjacent and slightly spaced from the top walls thereof. Preferably, the outlet or bottom end of each of these tubes is provided with a screen 156, 158, 160 to prevent the ingress of debris or the like.

Referring now to FIGS. 5 through 8, a proportioner apparatus in accordance with a second embodiment of the invention is illustrated. This second proportioner apparatus is substantially similar in many respects to the proportioner apparatus heretofore illustrated and described in FIGS. 1 through 4. Accordingly, like reference numerals, together with the suffix a are utilized to designate like elements and components of the proportioner illustrated in FIG. 5.

Departing from the embodiment of FIGS. 1 through 4, a different stratification preventing means or assembly 101a is utilized in the embodiment of FIGS. 5 through 8. This stratification preventing means or arrangement 101a comprises a relatively enlarged mixing chamber 200, which is coupled to receive the respective outlet conduits 28a and 30a, generally in place of the intermediate or connecting conduit 70 illustrated in FIG. 1. Referring also to FIGS. 7 and 8, the enlarged mixing chamber also has an outlet 202 which delivers fluid to the inlet conduit 102 of the third or lower reservoir 100a. In this regard, the agitator means or assembly 101 is not utilized in the embodiment of FIG. 5.

Rather, as also seen in FIGS. 6 and 7, the enlarged mixing chamber 200 is generally a cylindrical, tubular member which receives the smaller diameter cylindrical tubular conduits 28a, 30a generally at either axial end thereof. In this regard all three of these members 28a, 30a and 200 are preferably substantially coaxially disposed with the axis thereof lying generally in a horizontal plane. Preferably, the outlet conduit 30a which is associated with a relatively heavier fluid such as syrup from the syrup reservoir 14a has a stub extension portion 204 which extends into the chamber 200.

In order to prevent stratification of fluids upon shutdown of the system, the syrup outlet to chamber 200 provided in the stub extension 204 consists solely of slot means in the form of an elongate slot 206 generally at a vertically upper edge thereof. In the illustrated embodiment, this slot 206 is of a width substantially less than the diameter of the stub extension 204 and exists from a free outer end thereof a predetermined axial length, so as to confine fluid flow thereto. . The axial length of slot 206 is such as to confine the slot entirely within the chamber 200. Moreover, the stub 204 is preferably substantially coaxially centered over the outlet orifice 202 and conduit 102a coupled therewith. It will also be noted that the stub extension 202 has a closed free outer end 208.

Accordingly, upon shutdown of the system, and in particular upon cessation of fluid flow of syrup from the reservoir 14a through the outlet conduit 30a, the syrup flow through slot 206 will be halted substantially immediately by gravity. That is, the relatively heavy syrup, absent flow in the outlet conduit 30a will not continue to exit the vertically upwardly facing slot 206 into the chamber 200. Accordingly, stratification of syrup is thereby substantially prevented upon shutdown of the system.

In accordance with a further preferred feature illustrated in FIGS. 5 and 8, an additional novel vent cap assembly 220 is provided for the respective vents 150a, 152a and 154a. Preferably, the vent caps 220 comprise an inverted, generally cup-shape cap member 222 which is attached to the open top end of the associated vent, as best viewed in FIG. 8, by a so-called "spider" or three-legged clip-type member 224. Preferably, the member 224 has respective outwardly extending legs for gripping interior surfaces of the conduit 150a so as to hold the cup-like cap 220 substantially centered thereover and elevated somewhat thereabove to provide for flow of air or gases to be vented therearound while substantially preventing splashing of fluid through the open tops of the respective vents. This prevention of splash-over of fluids relative to the vents is particularly important during cleaning of the proportioner apparatus, during which substantial quantities of hot water are flushed through all portions of the apparatus. In this latter regard, one such cleaning system is partially illustrated in FIG. 5 in somewhat diagrammatic form. This cleaning arrangement comprises an additional conduit 230 which is coupled to the inlet reservoir 22a and feeds an on/off control valve 232. This on/off control valve 232 feeds branch conduits 234 and 236 which extend to the respective lower reservoir 100a and syrup reservoir 14a. These respective conduits 234 and 236 supply boiling water or other cleaning solution to respective perforated ball-type spray heads 238, 240 which are disposed at upper portions of the respective reservoirs 14a and 100a. In this regard, during the cleaning operation the inlet conduit 22a is preferably reconnected by suitable means (not shown) to receive a supply of boiling water or other selected cleaning solution for distribution to the respective spray heads.

While particular embodiments of the invention have been shown and described, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined in the appended claims and equivalents thereof. Accordingly, the aim in the appended claims is to cover all such changes and modifications as fall within the true spirit and scope of the invention.

The mention is claimed as follows:

1. A proportioner apparatus for mixing together at least two fluids in controlled, preselected porportions, comprising: first and second fluid inlet reservoirs; first and second fluid inlet means coupled respectively for delivering fluids to the first and second reservoirs; first and second outlet means coupled respectively with said reservoirs for receiving a flow of fluid therefrom; each said inlet means having a control valve for controlling the flow of fluid therethrough in response to predetermined control signals, and each said reservoir having level sensing means therein for producing said predetermined control signals in accordance with the level of fluid therein; and orifice-defining means associated with at least one of said outlet means for, together with the level of fluid in the associated reservoir, controlling the rate of flow of fluid through the outlet means, said orifice-defining means comprising a plate-like member having a through orifice of a selectable size and mounting means for holding said plate and for removably introducing said plate into the outlet means for restricting the fluid flow therethrough to said through orifice; whereby any desired one of a plurality of different flow rates may be achieved by selection and placement in said outlet means of a removable mounting means having a plate with an orifice of a size selected to achieve the desired flow rate; and further including a third, outlet reservoir located beneath the first and second reservoirs and an inlet conduit for delivering fluid to said third reservoir and extending thereabove; said first and second outlets being coupled together downstream of said at least one orifice-defining means for feeding the respective fluids therefrom into said inlet conduit to be intermixed.

2. Apparatus according to claim 1 wherein at least one of said reservoirs has parallel and spaced top and bottom walls and sidewall means joining the top and bottom walls; said inlet means comprising an inlet conduit extending through said top wall and said outlet means comprising an outlet conduit extending from an outlet opening in said bottom wall; said top wall having an opening aligned with said outlet opening for receiving said mounting means; said mounting means comprising an elongate member having a transverse member at an upper end thereof relative to said reservoir for suspending said elongate member from said top wall opening, said elongate member being of sufficient length to extend through the reservoir and to said outlet opening, and a plate-carrier member coupled with a lower end of said elongate member for holding said plate and positioning the same within said outlet means.

3. Apparatus according to claim 2 wherein said outlet comprises a generally cylindrical tubular member coupled with said outlet opening and wherein said plate-carrier member comprises a generally annular support member having an annular sealing ring thereabout for sealing engagement with an internal surface of said generally cylindrical tubular member.

4. Apparatus according to claim 3 wherein said mounting means further comprises a hanger member extending divergently from said elongate member lower end to receive and support said annular plate-carrier suspended therefrom so as to hold the latter substantially centered relative to both said elongate member and said generally cylindrical outlet conduit.

5. Apparatus according to claim 1 and further including agitator means in said third inlet conduit for facilitating the intermixing of fluids therein.

6. Apparatus according to claim 5 and further including baffle means in said third inlet conduit adjacent said agitator means for further facilitating the intermixing of fluids therein.

7. Apparatus according to claim 1 and further including adjustable flow restricting means in said inlet conduit to control, together with the head of fluid thereabove, the rate of flow of fluid therethrough.

8. Apparatus according to claim 7 wherein said adjustable flow restricting means includes an operator accessible micrometer-like adjustment member having vernier-like indicia thereon.

9. Apparatus according to claim 1 wherein each of said first and second outlets additionally has an adjustable valve member therein responsive to predetermined control signals for controlling the flow of fluid therethrough.

10. Apparatus according to claim 9 and further including level sensing means operatively associated with said outlet reservoir for producing said predetermined control signals for control of said adjustable valve members in said outlet conduits in accordance with the level of fluid in said outlet reservoir.

11. A proportioner apparatus for mixing together at least two fluids in controlled, preselected proportions, comprising: first and second fluid, inlet reservoirs; first and second fluid inlet means coupled respectively for delivering fluids to the first and second reservoirs; first and second outlet means coupled respectively with said reservoirs for receiving a flow of fluid therefrom; each said inlet means having a control valve for controlling the flow of fluid therethrough in response to predetermined control signals, and each said reservoir having level sensing means therein for producing said predetermined control signals in accordance with the level of fluid therein; orifice-defining means associated with at least one of said outlet means for, together with the level of fluid in the associated reservoir, controlling the rate of flow of fluid through the outlet means; a third, outlet reservoir located beneath the first and second reservoirs and an inlet conduit for delivering fluid to said third reservoir and extending thereabove; said first and second outlets being coupled together downstream of said at least one orifice-defining means for feeding the respective fluids therefrom into said inlet conduit to be intermixed, and means for preventing stratification of the fluids in said inlet conduit for facilitating the intermixing of fluids therein for delivery to the third reservoir.

12. Apparatus according to claim 11 wherein said stratification preventing means includes agitator means in said inlet conduit for facilitating the intermixing of fluids therein.

13. Apparatus according to claim 12 wherein said stratification preventing means includes baffle means in said inlet conduit adjacent said agitator means for further facilitating the intermixing of fluids therein.

14. Apparatus according to claim 11 wherein said stratification preventing means comprises an enlarged mixing chamber coupled to receive fluid from said first and second outlet means, and one of said outlet means associated with a reservoir for relatively denser fluids having a stub extension extending generally in a horizontal direction within said enlarged chamber; said stub extension having slot means at a vertically upper portion thereof forming the sole outlet thereof for release of fluids into said enlarged chamber, such that upon cessation of fluid flow in said second outlet means, the flow of fluid through said vertically upper slot means to said enlarged mixing chamber is stopped substantially immediately by gravity.

15. Apparatus according to claim 14 wherein said inlet and outlet conduits and said enlarged mixing chamber are substantially cylindrical, tubular conduits and substantially coaxially aligned in a horizontal orientation, and wherein said stub extension comprises a cylindrical tubular extension of its associated outlet conduit, said slot means comprising an elongate slot of predetermined width and length entirely located within said enlarged chamber and oriented substantially symmetrically about a vertically uppermost portion of said generally horizontally disposed extension, the outermost free end of said extension being closed.

16. Apparatus according to claim 11 wherein said orifice-defining means comprises a plate-like member having a through orifice of a selectable size and mounting means for holding said plate and for removably introducing said plate into the outlet means for restricting the fluid flow therethrough to said through orifice; whereby any desired one of a plurality of different flow rates may be achieved by selection and placement in said outlet means of a removably mounting means having a plate with an orifice of a size selected to achieve the desired flow rate.

17. A proportioner apparatus for mixing together at least two fluids in controlled, preselected proportions, comprising: first and second fluid inlet reservoirs; first and second fluid inlet means coupled respectively for delivering fluids to the first and second reservoirs; first and second outlet means coupled respectively with said reservoirs for receiving a flow of fluid therefrom; each said inlet means having a control valve for controlling the flow of fluid therethrough in response to predetermined control signals, and each said reservoir having level sensing means therein for producing said predetermined control signals in accordance with the level of fluid therein; and orifice-defining means associated with at least one of said outlet means for, together with the level of fluid in the associated reservoir, controlling the rate of flow of fluid through the outlet means, said orifice-defining means comprising a plate-like member having a through orifice of selectable size and mounting means for holding said plate and for removably introducing said plate into the outlet means for restricting the fluid flow therethrough to said through orifice; whereby any desired one of a plurality of different flow rates may be achieved by selection and placement in said outlet means of a removable mounting means having a plate with an orifice of a size selected to achieve the desired flow rate; wherein at least one of said reservoirs has parallel and spaced top and bottom walls and sidewalls means joining the top and bottom walls; said inlet means comprising an inlet conduit extending through said top wall and said outlet means comprising an outlet conduit extending from an outlet opening in said bottom wall; said top wall having an opening aligned with said outlet opening for receiving said mounting means; said mounting means comprising an elongate member having a transverse member at an upper end thereof relative to said reservoir for suspending said elongate member from said top wall opening, said elongate member being of sufficient length to extend through the reservoir and to said outlet opening, and a plate-carrier member coupled with a lower end of said elongate member for holding said plate and positioning the smae within said outlet means.

* * * * *